(12) United States Patent
Fischer et al.

(10) Patent No.: US 7,996,550 B2
(45) Date of Patent: Aug. 9, 2011

(54) PEER-TO-PEER DOWNLOAD WITH QUALITY OF SERVICE FALLBACK

(75) Inventors: Donald Fischer, Westford, MA (US); Havoc Pennington, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 426 days.

(21) Appl. No.: 11/565,144

(22) Filed: Nov. 30, 2006

(65) Prior Publication Data

US 2008/0133535 A1    Jun. 5, 2008

(51) Int. Cl.
*G06F 15/16* (2006.01)
(52) U.S. Cl. .............. 709/231; 725/81; 370/23
(58) Field of Classification Search .................. 709/223, 709/231; 725/81; 370/23
See application file for complete search history.

(56) References Cited

U.S. PATENT DOCUMENTS

| | | | | |
|---|---|---|---|---|
| 7,142,645 | B2 * | 11/2006 | Lowe | 379/88.16 |
| 7,174,385 | B2 * | 2/2007 | Li | 709/231 |
| 2005/0172028 | A1 * | 8/2005 | Nilsson et al. | 709/231 |
| 2005/0177853 | A1 * | 8/2005 | Williams et al. | 725/81 |
| 2006/0270429 | A1 * | 11/2006 | Szymanski et al. | 455/518 |
| 2006/0288112 | A1 * | 12/2006 | Soelberg et al. | 709/231 |
| 2007/0088817 | A1 * | 4/2007 | Li | 709/224 |
| 2008/0112315 | A1 * | 5/2008 | Hu et al. | 370/230 |

\* cited by examiner

*Primary Examiner* — Tammy T Nguyen
(74) *Attorney, Agent, or Firm* — MH2 Technology Law Group LLP

(57) ABSTRACT

An embodiment relates generally to a method for playing for a file. The method includes initiating a playback for a selected file on a reserved server, where the selected file is also distributed in segments across a peer-to-peer network. The method also includes initiating a retrieval of the selected file from the peer-to-peer network or reserved server and ordering the retrieved segments of the selected file for playback. The method further includes switching playback of the selected file between the peer-to-peer network and reserved server according to the real-time performance and availability of the peer-to-peer network and reserved server.

18 Claims, 3 Drawing Sheets

PEER-TO-PEER DOWNLOAD WITH QUALITY OF SERVICE FALLBACK

FIELD

This invention relates generally to file transfers, more particularly, to methods, apparatus and systems for peer-to-peer download with quality of service fallback.

DESCRIPTION OF THE RELATED ART

File transfers in a network computer system is a generally well-known concept. For example, in the early days of the Internet, file transfers were accomplished by connecting to a destination computer and executing a file transfer command.

Currently, the file transfers may include video, image, audio, application, or other similar information. The files are typically stored in a single server acting as an access point. A user may be assured that the file would be available. However, the server processing a file transfer request has to allocate network bandwidth and server resources to process the request. Accordingly, a server has less available resources to service other types of requests, and thus lowering the overall performance of the server.

One solution to avoid tying up a server for file transfer is to use a peer-to-peer (P2P) network. In general, the P2P network is a computer network that relies primarily on the computing power and bandwidth of the participants in the network rather than concentrating it in a relatively low number of servers. P2P networks are typically used for connecting nodes via largely ad hoc connections.

Although the P2P network can resolve the demand on a server, this solution also has drawbacks and disadvantages. For example, the download or playback of a file is not guaranteed. More particularly, since the file is distributed across the peers in the network, file playback or download may be disrupted by one of the peers either being busy or down.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of networked computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems, methods and apparatus for peer-to-peer (P2P) download with a guarantee of quality of service. The method includes initiating a playback for a selected file on a reserved server, where the selected file is also distributed in segments across a peer-to-peer network. The method also includes initiating a retrieval of the selected file from the peer-to-peer network or reserved server and ordering the retrieved segments of the selected file for playback. The method further includes switching playback of the selected file between the peer-to-peer network and reserved server according to the real-time performance and availability of the peer-to-peer network and reserved server.

In one embodiment, a guaranteed quality of service (GQOS) client may be configured to provide data (e.g., music, video) at a minimum quality of service from a P2P system. The GQOS client may implement a heuristic or algorithm that comprises initiating a data service from a dedicated server. The GQOS client may then initiate a P2P network to gather the later segments of the selected file. As the later segments are ready, the GQOS client queues the next segment from the P2P network. If the GQOS client determines that an upcoming segment is not available, the GQOS client may then retrieve that segment from the reserved server. Accordingly, the majority of the file may be gathered by the P2P network members and maintain a level of desired service while not occupying the resources of the reserved server. Alternatively, the GQOS client may initiate retrieval first from the reserved server and then turn to the P2P network. As another variation, the GQOS client may initiate both the reserved server and P2P network and schedule transitions between them based on their real-time performance.

Figure 1:
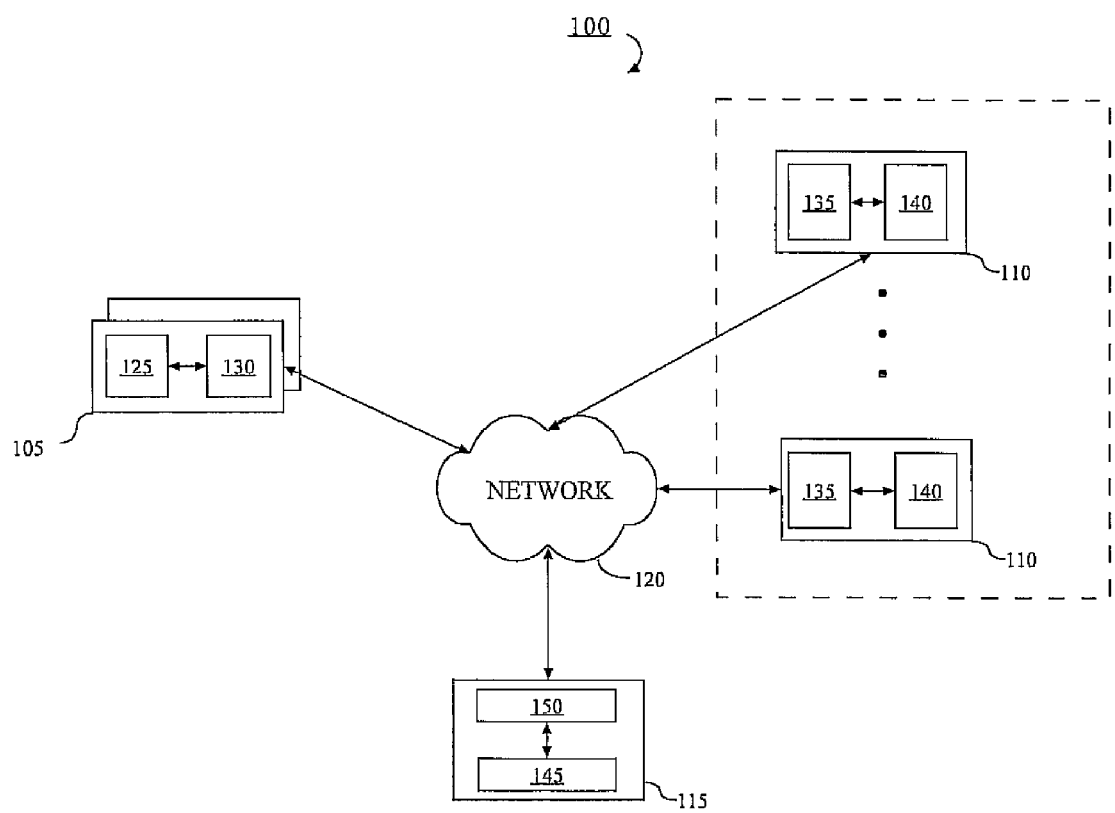
FIG. 1 illustrates an exemplary system in accordance with an embodiment.

FIG. 1 illustrates an exemplary system in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system may include a plurality of reserved servers 105, a plurality of peers 110, and a user platform 115. The reserved servers 105, the peers 110 and the client 115 may be coupled with a network 120. The network 120 may be a local area network, a wide area network or a combination thereof. The local area network may be an IEEE 802.xx network, ad hoc network, or combinations thereof. The wide area network may be X.25, ATM, SONET, Internet or combinations thereof.

The reserved servers 105 may be a computing machine or platform configured to at least store files 125 for download or playback for the users such as user platform 115. The files may be music, video and/or application files. The reserved servers 105 may also execute an operating system 130 to provide, among other things, the functionality for playback or download. The reserved servers 105 may be implemented with server platforms as known to those skilled in the art from Intel, Advanced Micro Devices, Hewlett-Packard, etc.

The peers 110 may be a collection of servers and/or clients participating in a peer-to-peer (P2P) network. The peers 110, collectively, store the same files as the reserved servers 105.

However, each peer 110 may store segments of an individual file in a local memory 140. The entire file may be retrieved by using the underlying P2P protocol 135 such as Bit-Torrent, KaZaa, Napster, CAN, CHORD, or other similar P2P protocol. Of note, in addition to typical public torrents, the torrent used by embodiments of the present invention can be private or secure (e.g., personal video).

Although FIG. 1 depicts the reserved servers 105 and the peers 110 as separate entities, it should be readily obvious to one of ordinary skill in the art that the separation is a logical separation and done for the sake of clarity. In various embodiments, the reserved servers 105 and peers 110 may be distributed, intermingled or co-located in a geographic sense.

The user platform 115 may be computing machine or platform configured to execute secure and open applications through an operating system 145. The operating system 145 may be configured to provide a software platform to provide services, such as download or playback of files. The user platform 115 may be implemented with personal computers, workstations, thin clients, thick clients, or other similar computing platform. The user platform 115 may use operating systems such as Linux, Windows, Macintosh or other available operating systems known to those skilled in the art.

In some embodiments, the user platform 115, among other functionalities, may execute a guaranteed quality of service (GQOS) client 150. The GQOS client 150 may be configured to provide a user the capability to retrieve or playback a file from the peers 110 with a guaranteed level of service. More particularly, the user of the user platform 115 may initiate a request for playback or download of a file. The GQOS client 150 retrieve the metadata associated with the selected file and then start the requested function for the selected file from one of the reserved servers 105 that stores the requested file. The GQOS client 150 may also initiate a download of the requested file from the peers 110. The GQOS client 150 may use the retrieved metadata of the selected file to monitor the progress of the P2P download of the selected file as well as the progress of the transfer of the selected file from the reserved server 105. If the P2P download from the peers 110 is sufficient to support the requested playback or download, the GQOS client 150 may switch from the reserved server 105 to the P2P download by the peers 110.

While the transfer of the selected file is being sourced by the peers 110, The GQOS client 150 may also monitor the status of each of the subsequent segments of the selected file. If a subsequent segment has not or will not complete download by the time of download or playback by the peers 110, the GQOS client 150 may retrieve the subsequent segment from the reserved server 105. Accordingly, a user may obtain a guaranteed level of service from a P2P network without monopolizing the resources of a single server.

Figure 2:
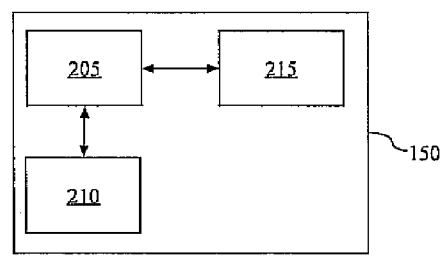
FIG. 2 illustrates an exemplary quality of service client in accordance with another embodiment.

FIG. 2 illustrates an exemplary GQOS client 150 in accordance with another embodiment. It should be readily apparent to those of ordinary skill in the art that the GQOS client 150 depicted in FIG. 2 represents a generalized schematic illustration and that other components may be added or existing components may be removed or modified. Moreover, the GQOS client 150 may be implemented using software components, hardware components, or combinations thereof.

As shown in FIG. 2, the GQOS client 150 may comprise a control module 205 coupled to a memory 210 and an interface 215. The control module 205 may be configured to provide an execution platform for the functionality of the GQOS client 150 as described previously and in further detail below. The control module 205 may be implemented as an integrated circuit such as application specific integrated circuit, field programmable gate array or other similar programmable device, combination of circuits, microprocessor, or digital signal processor. Alternatively, the GQOS client 150 may be implemented as software program, application, subroutine, and/or function call. In yet other embodiments, the GQOS client 150 may be combination of hardware and software components as known to those skilled in the art.

The memory 210 may be configured to provide a storage function for the GQOS client 150. The memory 210 may be used, among others, as an area to store downloaded files or as temporary buffer for files being played in real time. The memory 210 may also store a software application that provides the functionality of the GQOS client 150. The memory 210 may be implemented using high speed memory such as dynamic random access memory or other similar technologies. In alternative embodiments, the memory 210 may be allocated in the main memory by the underlying operating system in response to the invocation of the GQOS client 150.

The interface 215 may be configured to provide a communication port for the control module 205 to interact with the operating system as well as the reserved servers 105 and peers 110. The interface 215 may be implemented as a standard interface such as peripheral control interface, SCSI, IEEE1394 in hardware embodiments or a software port in software embodiments.

Accordingly, the control module 205 may be configured to receive a request for playback or download of a selected file. The control module 205 retrieve the metadata associated the selected file through the interface 215 and then start the requested function for the selected file from one of the reserved servers 105 that stores the requested file. The control module 205 may also initiate a download of the requested file from the peers 110 to be stored in the memory 210. The control module 205 may use the retrieved metadata of the selected file to monitor the progress of the P2P download of the selected file from the peers 110 as well as the progress of the transfer of the selected file from the reserved server 105. If the P2P download from the peers 110 is sufficient to support the requested playback or download, the control module 205 may switch from the reserved server 105 to the P2P download by the peers 110.

While the transfer of the selected file is being sourced by the peers 110, the control module 205 may also monitor the status of each of the subsequent segments of the selected file. If a subsequent segment has not or will not complete download by the time of download or playback by the peers 110, the control module 205 may retrieve the subsequent segment from the reserved server 105. Accordingly, a user may obtain a guaranteed level of service from a P2P network without monopolizing the resources of a single server.

Figure 3:
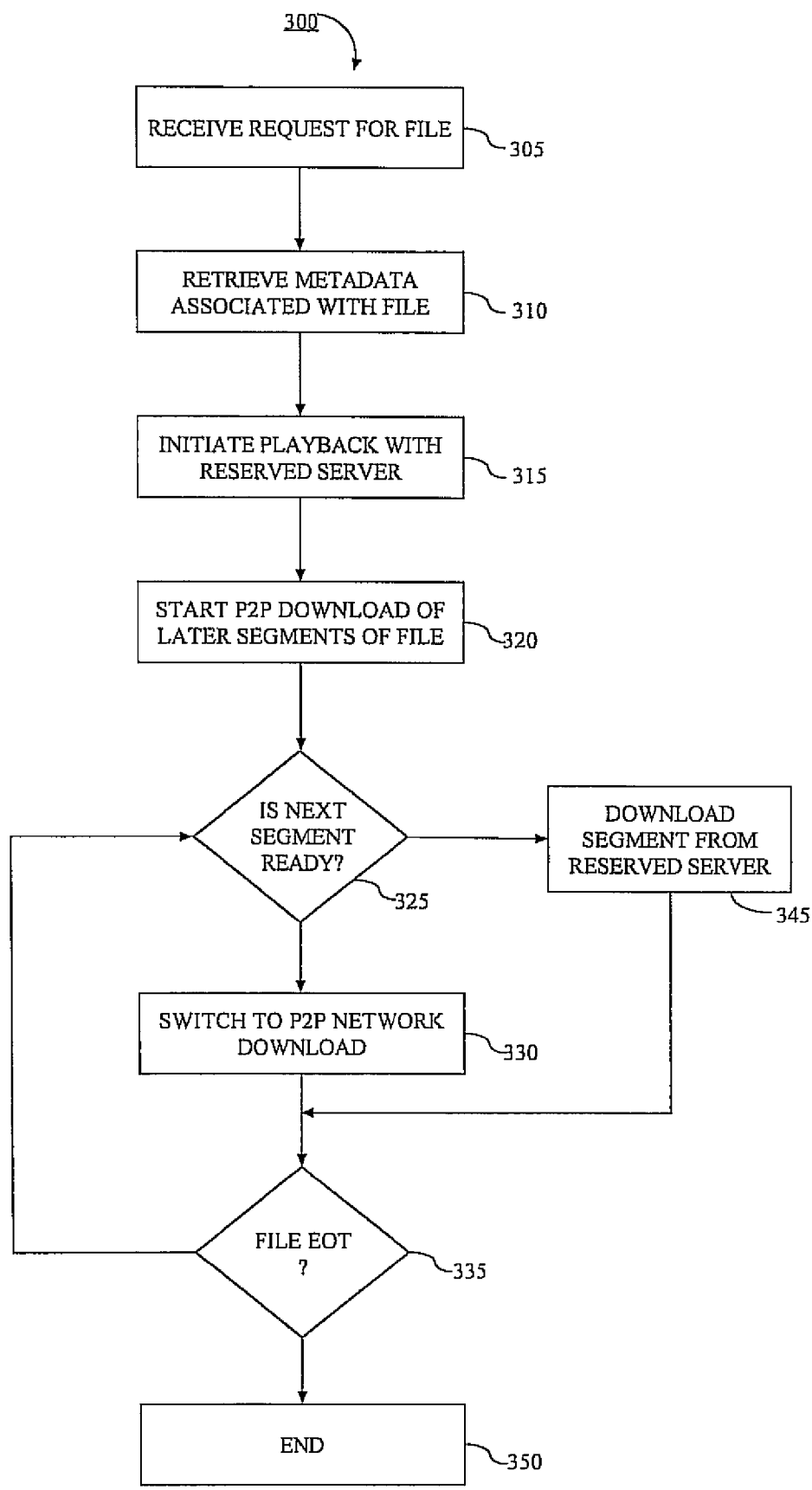
FIG. 3 illustrates an exemplary flow diagram implemented by the quality of service client in accordance with yet another embodiment.

FIG. 3 illustrates an exemplary flow diagram 300 implemented by the control module 205 of the GQOS client 135 in accordance with yet another embodiment. It should be readily apparent to those of ordinary skill in the art that the flow diagram 300 depicted in FIG. 3 represents a generalized schematic illustration and that other steps may be added or existing steps may be removed or modified.

As shown in FIG. 3, in step 30S, the control module 205 of the GQOS client 150 may receive a request for playback and/or download of a selected file. The control module 205 may retrieve metadata associated with the selected file through interface 215 and store the metadata in the memory 210, in step 310. The metadata provides information such as the size of the file, location, number of segments, playback rates, etc.

In step 315, the control module 205 may be configured to initiate the requested action (playback or download) from the reserved server 105 that stores the selected file. The control module 205 may use the memory 210 as either a storage location for a file download or a buffer for a file playback.

Subsequently or substantially simultaneously, the control module 205 may also initiate a P2P download of the selected file from the peers 110, in step 320. The control module 205 may be configured to determine whether the next segment from the P2P download is ready based on the current position of the file from the reserved server 105, in step 325. If the next segment is ready for playback or download, the control module 205 may switch the playback or download to the P2P downloaded file, in step 330. Subsequently, the control module 205 may be configured to determine whether the last segment has been downloaded or played, in step 335. If the end of the file has not been reached, the control module 205 returns to the processing of step 325. Otherwise, the control module 205 terminates the file download or playback.

Returning to step 325, if the control module 205 determines that the next segment is not ready for the requested action, the control module 205 may retrieve the next segment from the reserved server 105, in step 345. Subsequently, the control module 205 proceeds to the processing of step 335.

Figure 4:
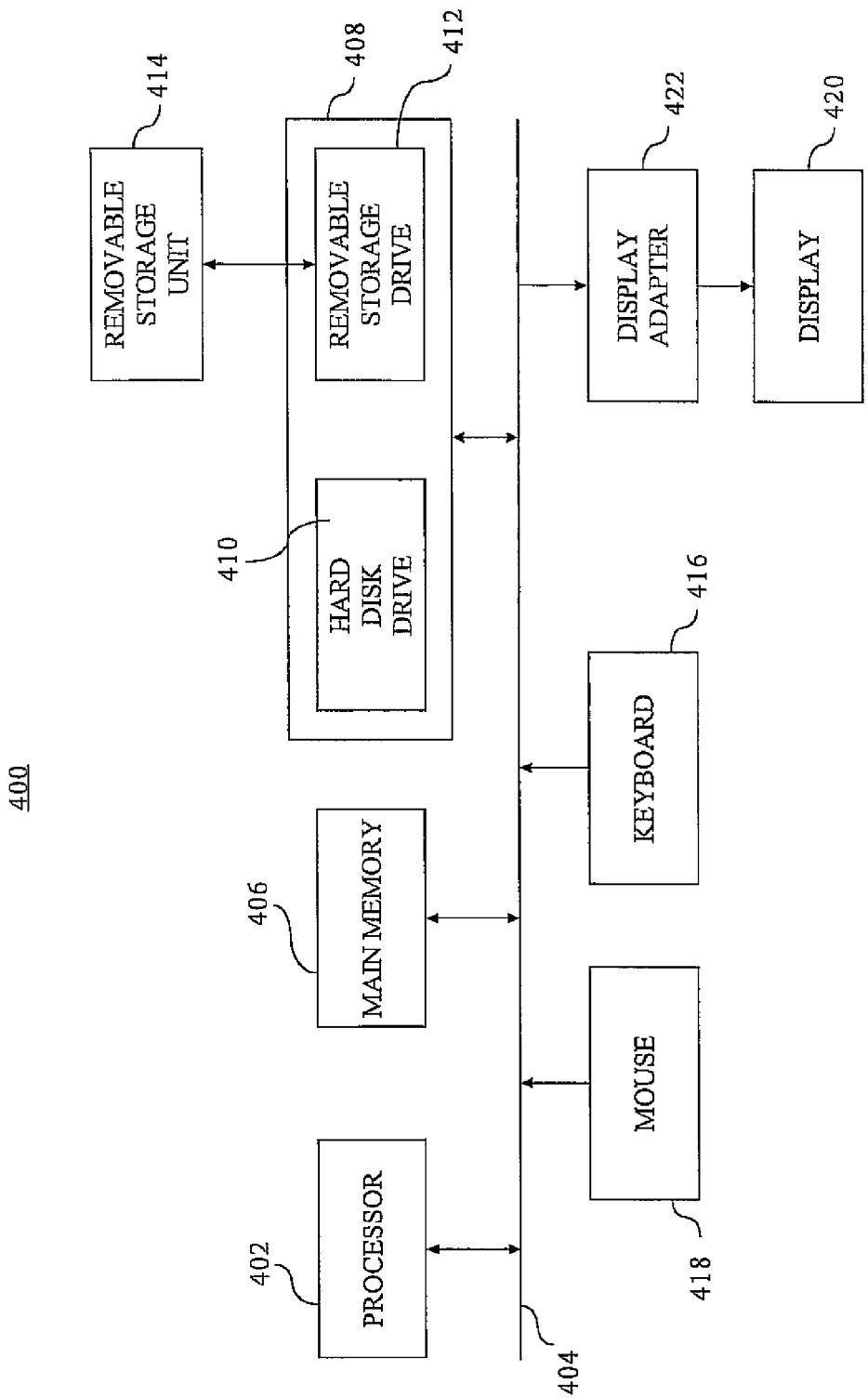
FIG. 4 illustrates an exemplary computing platform for executing the quality of service client in accordance with yet another embodiment.

FIG. 4 illustrates an exemplary block diagram of a computing platform 400 where an embodiment may be practiced. The functions of the operating system and GQOS client may be implemented in program code and executed by the computing platform 400. The operating system and delay process may be implemented in computer languages such as PASCAL, C, C++, JAVA, etc.

As shown in FIG. 4, the computer system 400 includes one or more processors, such as processor 402 that provide an execution platform for embodiments of the operating system and GQOS client. Commands and data from the processor 402 are communicated over a communication bus 404. The computer system 400 also includes a main memory 406, such as a Random Access Memory (RAM), where the operating system and GQOS client may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the operating system and GQOS client may be stored. The removable storage drive 412 reads from and/or writes to a removable storage unit 414 in a well-known manner. A user interfaces with the operating system and GQOS client with a keyboard 416, a mouse 418, and a display 420. A display adapter 422 interfaces with the communication bus 404 and the display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method for playing a file on a computer, the method comprising:
   initiating a retrieval of a file from a peer-to-peer network, wherein the file is distributed across the peer-to-peer network and is stored on a reserved server;
   beginning playback of a first segment of the file on the computer once the first segment of the file is retrieved and ready for playback;
   determining, during the playback of the first segment, whether a second segment of the file that is subsequent to the first segment will be ready for playback from the peer-to-peer network when the playback of the first segment completes;
   switching, during the playback of the first segment, retrieval of the file from the peer-to-peer network to the reserved server in response to determining that the second segment will not be ready for playback from the peer-to-peer network, wherein switching comprises initiating retrieval of the second segment from the reserved server in response to determining that the second segment of the file will not be ready for playback from the peer-to-peer network when the playback of the first segment completes:
   initiating retrieval from the peer-to-peer network of a third segment of the file that is subsequent to the second segment of the file;
   determining whether the third segment that is subsequent to the second segment of the file will be ready for playback when a playback of the second segment completes; and
   switching retrieval of a later segment of the file to the peer-to-peer network in response to determining that the third segment of the fife will be ready for playback when a playback of the second segment completes.

2. The method of claim 1, further comprising:
   maintaining an index structure for monitoring playback of the file.

3. The method of claim 1, wherein the peer-to-peer network is one of an unstructured peer-to-peer network and a structured peer-to-peer network.

4. The method of claim 1, wherein the peer-to-peer network is one of Bit Torrent, Napster, Gnutella, and KaZaA.

5. The method of claim 1, wherein the peer-to-peer network is one of Chord, Pastry, Tapestry, Content Addressable Network, and Tulip.

6. An apparatus comprising means to implement the method of claim 1.

7. A non-transitory computer-readable medium comprising computer-executable instructions for performing the method of claim 1.

8. An apparatus for delivering a file, the apparatus comprising:
  a memory containing instructions; a processor, operably connected to the memory, that executes the instructions to implement a control module configured to interface with a reserved server and a peer-to-peer network, wherein the control module is configured to perform operations comprising:
  initiating a retrieval of the file from the peer-to-peer network in response to an initiation of playback of the file, wherein the file is stored in the peer-to-peer network and in the reserved server;
  determining, during a playback of a first segment of the file, whether a second segment of the file that is subsequent to the first segment will be ready for playback from the peer-to-peer network when the playback of the first segment completes;
  switching, during the playback of the first segment, retrieval of the file from the peer-to-peer network to the reserved server in response to determining that the second segment will not be ready for playback from the peer-to-peer network;
  wherein switching comprises initiating retrieval of the second segment from the reserved server in response to determining that the second segment of the file will not be ready for playback from the peer-to-peer network when the playback of the first segment completes initiating retrieval from the peer-to-peer network of a third segment that is subsequent to the second segment of the file;
  determining whether the third segment of the file is available for retrieval from the peer-to-peer network before a playback of the second segment completes; and
  switching retrieval of the file to the peer-to-peer network if the third segment is available for retrieval from the peer-to-peer network before the playback of the second segment completes.

9. The apparatus of claim 8, wherein the control module is further configured to maintain an index structure for monitoring playback of the file.

10. The apparatus of claim 8, wherein the peer-to-peer network is one of an unstructured peer-to-peer network and a structured peer-to-peer network.

11. The apparatus of claim 8, wherein the peer-to-peer network is one of Bit Torrent, Napster, Gnutella, and KaZaA.

12. The apparatus of claim 8, wherein the peer-to-peer network is one of Chord, Pastry, Tapestry, Content Addressable Network, and Tulip.

13. A system for delivering a file, the system comprising: a reserved server configured to store a plurality of files;
  a peer-to-peer network configured to store copies of the plurality of files, wherein each file of the plurality of files is distributed throughout the peer-to-peer network; and
  a quality of service client configured to perform operations comprising:
  initiating a retrieval of a file among the plurality of files from the peer-to-peer network in response to an initiation of playback of the file;
  determining, during a playback of a first segment of the file, whether a second segment of the file that is subsequent to the first segment will be ready for playback from the peer-to-peer network when the playback of the first segment completes;
  switching, during the playback of the first segment, retrieval of the file from the peer-to-peer network to the reserved server in response to determining that the second segment will not be ready for playback from the peer-to-peer network; wherein switching comprises initiating retrieval of the second segment from the reserved server in response to determining that the second segment of the file will not be ready for playback from the peer-to-peer network when the playback of the first segment completes initiating retrieval from the peer-to-peer network of a third segment that is subsequent to the second segment of the file;
  determining whether the third segment of the file is available for retrieval from the peer-to-peer network before a playback of the second segment completes; and
  switching the retrieval of a subsequent segment of the file to the peer-to-peer network if the third segment is available for retrieval from the peer-to-peer network before the playback of the second segment completes.

14. The system of claim 13, wherein the quality of service client is further configured to maintain an index structure for monitoring playback of the file.

15. The system of claim 13, wherein the peer-to-peer network is one of an unstructured peer-to-peer network and a structured peer-to-peer network.

16. The system of claim 13, wherein the file is a music file.

17. The system of claim 13, wherein the file is a video file.

18. A method for playing a file on a computer, the method comprising:
  initiating a retrieval of a file from a reserved server, wherein the file is also distributed on a peer-to-peer network;
  beginning playback of a first segment of the file once the first segment of the file is retrieved from the reserved server;
  determining, during the playback of the first segment, whether a second segment that is subsequent to the first segment is timely available from the peer-to-peer network; and
  switching, during the playback of the first segment, the retrieval of the file to the peer-to-peer network from the reserved server in response to determining that the second segment of the file is timely available from the peer-to-peer network, wherein switching comprises initiating retrieval of the second segment from the peer-to-peer network in response to determining that the second segment of the file is timely available for playback from the peer-to-peer network;
  initiating retrieval from the peer-to-peer network of a third segment that is subsequent to the second segment of the file;
  determining whether the third segment of the file is available for retrieval from the peer-to-peer network before a playback of the second segment completes; and
  switching the retrieval of a subsequent segment of the file to the reserve server if the third segment is not available for retrieval from the peer-to-peer network before the playback of the second segment completes.

* * * * *